(12) United States Patent
Korcyl et al.

(10) Patent No.: US 10,007,011 B2
(45) Date of Patent: Jun. 26, 2018

(54) SYSTEM FOR ACQUISITION OF TOMOGRAPHIC MEASUREMENT DATA

(71) Applicant: UNIWERSYTET JAGIELLONSKI, Cracow (PL)

(72) Inventors: Grzegorz Korcyl, Cracow (PL); Pawel Moskal, Czulowek (PL); Marcin Kajetanowicz, Cracow (PL); Marek Palka, Cracow (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 0 days. days.

(21) Appl. No.: 14/915,238

(22) PCT Filed: Aug. 29, 2014

(86) PCT No.: PCT/EP2014/068352
§ 371 (c)(1),
(2) Date: Feb. 28, 2016

(87) PCT Pub. No.: WO2015/028594
PCT Pub. Date: Mar. 5, 2015

(65) Prior Publication Data
US 2016/0209522 A1    Jul. 21, 2016

(30) Foreign Application Priority Data

Aug. 30, 2013 (PL) .......................... 405178

(51) Int. Cl.
*G01T 1/29* (2006.01)

(52) U.S. Cl.
CPC ................... *G01T 1/2985* (2013.01)

(58) Field of Classification Search
CPC ...................................... G01T 1/2985
See application file for complete search history.

(56) References Cited

U.S. PATENT DOCUMENTS

| 9,354,332 | B2 * | 5/2016 | Zwaans | ................. G01T 1/2985 |
| 2008/0128631 | A1 * | 6/2008 | Suhami | ..................... G01T 5/02 250/370.09 |

(Continued)

*Primary Examiner* — David Porta
*Assistant Examiner* — Djura Malevic
(74) *Attorney, Agent, or Firm* — Mark M. Friedman

(57) ABSTRACT

A system for acquisition of tomographic measurement data from measurement signals (S) of positron emission tomography (PET) or single-photon emission computed tomography (SPECT) detectors, the system comprising: a front-end electronic assembly (2) configured to convert the measurement signals (S) into digital and analog signals (DAS); a measurement electronics assembly (3) comprising time to digital converter (TDC) modules (31) configured to determine times (T) of pulses in digital signals (DS). The measurement electronics assembly (30) comprises: a series (TDCa-TDCd) of TDC modules (31), each module comprising a series (TDC1-TDC4) of TDC circuits (311-314); a module controller (315) configured to transmit a clock signal (CLK), input to the module controller (315) from a system controller (40), to each of the TDC circuits (311-314); wherein each of the TDC circuits (311-314) is configured to execute measurements in a measurement window delimited by the neighboring edges of the clock signal (CLK) which is common for all TDC circuits (311-314).

4 Claims, 4 Drawing Sheets

(56) References Cited

U.S. PATENT DOCUMENTS

| | | | | |
|---|---|---|---|---|
| 2008/0156993 A1* | 7/2008 | Weinberg | ............... | A61B 6/12 250/363.03 |
| 2015/0109621 A1* | 4/2015 | Huber | ............... | G01B 9/02004 356/479 |

* cited by examiner

SYSTEM FOR ACQUISITION OF TOMOGRAPHIC MEASUREMENT DATA

TECHNICAL FIELD

The present disclosure relates to a system for acquisition of tomographic measurement data for use particularly in positron emission tomography (PET) or single-photon emission computed tomography (SPECT). The system facilitates continuous recording of signals during measurements. The system facilitates optimum processing and saving of information delivered by signals from an assembly of detectors used in PET without the need to preselect these signals with the use of a triggering system. It further allows implementation of various algorithms supporting real-time analysis of acquired data.

BACKGROUND

Images of the interiors of bodies may be acquired using various types of tomographic techniques, which involve recording and measuring radiation from tissues and processing acquired data into images.

One of these tomographic techniques is positron emission tomography (PET), which involves determining spatial distribution of a selected substance throughout the body and facilitates detection of changes in the concentration of that substance over time, thus allowing to determine the metabolic rates in tissue cells.

The selected substance is a radiopharmaceutical administered to the examined object (e.g. a patient) before the PET scan. The radiopharmaceutical, also referred to as an isotopic tracer, is a chemical substance having at least one atom replaced by a radioactive isotope, e.g. $^{11}C$, $^{15}O$, $^{13}N$, $^{18}F$, selected so that it undergoes radioactive decay including the emission of a positron (antielectron). The positron is emitted from the atom nucleus and penetrates into the object's tissue, where it is annihilated in reaction with an electron present within the object's body.

The phenomenon of positron and electron annihilation, constituting the principle of PET imaging, consists in converting the masses of both particles into energy emitted as annihilation photons, each having the energy of 511 keV. A single annihilation event usually leads to formation of two photons that diverge in opposite directions at the angle of 180° in accordance with the law of conservation of the momentum within the electron-positron pair's rest frame, with the straight line of photon emission being referred to as the line of response (LOR). The stream of photons generated in the above process is referred to as gamma radiation and each photon is referred to as gamma quantum to highlight the nuclear origin of this radiation. The gamma quanta are capable of penetrating matter, including tissues of living organisms, facilitating their detection at certain distance from object's body. The process of annihilation of the positron-electron pair usually occurs at a distance of several millimeters from the place of the radioactive decay of the isotopic tracer. This distance constitutes a natural limitation of the spatial resolution of PET images to a few millimeters.

A PET scanner comprises detection devices used to detect gamma radiation as well as electronic hardware and software allowing to determine the position of the positron-electron pair annihilation event on the basis of the position and time of detection of a particular pair of the gamma quanta. The radiation detectors are usually arranged in layers forming a ring around object's body and are mainly made of an inorganic scintillation material. A gamma quantum enters the scintillator, which absorbs its energy to re-emit it in the form of light (a stream of photons). The mechanism of gamma quantum energy absorption within the scintillator may be of dual nature, occurring either by means of the Compton's effect or by means of the photoelectric phenomenon, with only the photoelectric phenomenon being taken into account in calculations carried out by current PET scanners. Thus, it is assumed that the number of photons generated in the scintillator material is proportional to the energy of gamma quanta deposited within the scintillator.

When two annihilation gamma quanta are detected by a pair of detectors at a time interval not larger than several nanoseconds, i.e. in coincidence, the position of annihilation point along the line of response may be determined, i.e. along the line connecting the detector centers or the points within the scintillator strips where the energy of the gamma quanta was deposited. The coordinates of annihilation place are obtained from the difference in times of arrival of two gamma quanta to the detectors located at both ends of the LOR. In the prior art literature, this technique is referred to as the time of flight (TOF) technique and the PET scanners utilizing time measurements are referred to as TOF-PET scanners. This technique requires that the scintillator has a time resolution of a few hundred picoseconds.

Light pulses reaching the scintillator can be converted into electric pulses by means of photomultipliers or photodiodes. Electric signals from the converters carry information on positions and times of the annihilation quanta subject to detection, as well as on the energy deposited by these quanta.

The principal elements of the signal processing system within the radiation detectors are leading edge discriminators and constant fraction discriminators. These elements, combined with time-to-digital converters, facilitate the measurement of time at which the electric signals generated at these detectors exceed a preset reference voltage or a preset signal amplitude fraction, respectively. Said discriminators are built on the basis of standard electronic components and include, among other components, a current source, a pre-amplifier, a comparator, a shaper, capacitors, resistors, diodes, transistors and transmission lines. If the detector signal is higher than the threshold voltage set at the discriminator, a logical signal is generated at the discriminator output, carrying information on the time at which the gamma quantum was recorded. The charge is measured by means of analog-to-digital converters.

Temporal resolutions of leading edge and constant fraction discriminators are limited by the dependence of the discriminator response on the shape of signals and, in case of leading edge discriminators, also on the amplitude of input signals. Due to the so-called time walk effect, time determined using leading edge discriminators changes along with the signal amplitude. The effect may be adjusted to a certain degree if the signal charge or amplitude is measured simultaneously. In case of constant fraction discriminators, the time at which the signal exceeds the preset amplitude fraction is generally not dependent on the amplitude, but it may change depending on the shape of the signal (i.e on the temporal distribution of photons).

Logical signals generated at discriminators are processed by means of sequences of logical operations within a triggering system. These operations result in a logical signal providing information on whether the recorded event should be subjected to further electronic processing. The sequences of logical operations are selected depending on the types of detectors, configuration of modules and the frequencies of recorded events; the main objective of these operations is to discard signals that are not useful for image reconstruction and thus to minimize acquisition dead times as well as times required to process the data and reconstruct the images.

The PCT applications WO2011/008119 and WO2011/008118 describe various aspects of PET scanners that may be of relevance for understanding this description. In particular, a method for determining the place of ionization on the basis of the distribution of times or amplitudes of signals measured at different positions along the scintillator. These documents describe solutions that are based on the measurements of the times of flight required for light pulses to reach detector edges. Changes in shapes and amplitudes of signals depending on the place of ionization and the quantity of energy constitute a constraint in temporal resolutions that can be achieved using the technique. The larger the scintillator, the larger the variations in signal shapes and amplitudes. For the above reasons, temporal resolutions of less than 100 ps cannot be obtained for large scintillator blocks according to the prior art. Temporal resolution also impacts the resolution of ionization place determination. In case of polymer scintillators (preferred due to their low price), amplitudes of signals generated by the gamma quanta, including annihilation gamma quanta used in positron emission tomography, are characterized by continuous distribution resulting from interactions between gamma quanta and electrons occurring mostly via the Compton effect with a negligibly low probability of a photoelectric effect. As a consequence, signal amplitudes in polymer scintillators may change even if the signals originated in the same position. In case of Compton interactions, constraints in the achieved resolution are due to the fact that the amplitude of electric signals generated by the photomultipliers depends on two unknown values, namely on distance between the ionization place and the photomultiplier and on energy deposited by the gamma quantum. The effects described above contribute to deterioration in both temporal and spatial resolution also in case of monoenergetic energy-loss distributions, which occur e.g. in the photoelectric effect.

Currently, positron emission tomography involves the use of multimodule detection systems consisting of scintillation crystals and photomultipliers. An example of such a known system is presented in FIG. 1. The electric signals S generated at photomultipliers 1 and carrying information on the positions and times of annihilation quanta being recorded at the detectors as well as on the energy deposited by these quanta are transformed into logical signals in analog leading edge discriminators or constant-fraction discriminators included in the front-end electronics assembly 2. If the detector signal is higher than the threshold voltage set at the discriminator, a logical signal is generated at the discriminator output, carrying information on the time the gamma quantum was recorded. The digital and analog signals (DAS) from the front-end electronics assembly 2 are then transformed by a triggering system 4, in which the logical signals received from the discriminators are subjected to a sequence of logical operations resulting in a logical trigger signal TS providing information on whether the recorded event should or should not be subjected to further electronic processing. The sequences of logical operations are selected depending on the types of detectors, configuration of modules and the frequencies of recorded events; the main objective of these operations is to discard signals that are not useful for image reconstruction and thus to minimize acquisition dead times as well as times required to process the data and reconstruct the images. In parallel to being sent to the triggering system 4, the DASs from the front-end electronics assembly are sent to a measurement systems assembly 3. The assembly 3 comprises time to digital converters (TDC), where digital signals are converted into digits representing time intervals between the digital pulse from the front-end electronics assembly 2 and the trigger signal TS. The measurement systems assembly also includes analog to digital converters (ADC) for measuring the charge of the analog signals. Numbers representing results of the measurements in form of information on time T and amplitude A of the measured signals S are then sent into the computer system 5 to be saved onto disk and for further data analysis.

Standard readout systems employ analog to digital converters ADC providing information on the charge of the entire signal; moreover, continuous sampling of analog signals is also used in prototypic solutions currently under development. In this case, continuous sampling refers to the mode of ADC operation, consisting in collecting a specific number of analog signal samples and filling the shift buffer until receiving the read signal and then saving the buffer contents. The read signal is generated on the basis of logic that qualifies individual events as relevant.

A U.S. Pat. No. 8,164,063 discloses an acquisition system employing digitization of analog signals using ADC and TDC circuits. The systems are triggered when a certain threshold is exceeded by the analog signal. The measurement data obtained from these systems are used as input data for a sophisticated, multi-level system that decides whether to send these data further or to discard them when classified as background.

In addition, a U.S. Pat. No. 7,091,489 describes a system including a dedicated coincidence processor to analyze data from TDC circuits. The readout of digitized data is commenced only when a positive response is received from the processor.

Regardless of solutions being used to process or sample analog signals and of the subsequent digital processing of said signals, the state of the art acquisition data system for positron emission tomography (PET) or single-photon emission computed tomography (SPECT) consist of a single- or multi-level triggering system making decisions about digitization of the recorded signals and saving information about the event onto memory carriers.

The solutions disclosed in patent applications WO2011/008119 and WO2011/008118 are based on organic polymer scintillators characterized by very short light pulses with decay times on the order of 1.5 ns, leading to practical total pulse widths of less than 10 ns. Thus, they allow for virtually complete elimination of random coincidences as known to occur in PET or SPECT scanners of the state of the art. The durations of light pulses in polymer scintillators are approximately the same as the maximum differences in times required for the annihilation quanta to reach the detectors. Said solutions are characterized in that signals from different annihilation events are significantly separated in time and it is justifiable to save all events without pre-selecting them so as to minimize the information losses regarding the studied density distribution of the radiopharmaceutical in object's body.

It would be expedient to develop a solution facilitating constant recording of data acquired during PET or SPECT imaging procedures, thus allowing for lossless saving of multiple events without the need to use a triggering system and pre-selection of events at the level of readout electronic systems.

SUMMARY

There is disclosed herein a system for acquisition of tomographic measurement data from measurement signals (S) of positron emission tomography (PET) or single-photon emission computed tomography (SPECT) detectors, the system comprising: a front-end electronic assembly (2) configured to convert the measurement signals (S) into digital and analog signals (DAS); a measurement electronics assembly (3) comprising time to digital converter (TDC) modules (31) configured to determine times (T) of pulses in digital signals (DS). The measurement electronics assembly (30) comprises: a series (TDCa-TDCd) of TDC modules (31), each module comprising a series (TDC1-TDC4) of TDC circuits (311-314); a module controller (315) configured to transmit a clock signal (CLK), input to the module controller (315) from a system controller (40), to each of the TDC circuits (311-314); wherein each of the TDC circuits (311-314) is configured to execute measurements in a measurement window delimited by the neighboring edges of the clock signal (CLK) which is common for all TDC circuits (311-314).

Preferably, the clock signal (CLK) has a constant frequency throughout the signal acquisition period in PET or SPECT imaging.

Preferably, the TDC circuits (311-314) are FPGA circuits.

Preferably, the system controller (40) is an FPGA circuit.

The system presented herein facilitates continuous recording of data acquired during PET or SPECT imaging, thus allowing for lossless saving of virtually all events. The system also allows for more accurate calibration adjustments of individual detection modules (see FIG. 3) even on the basis of data acquired while diagnosing a object. With electronic systems being configured so that the time of an individual measurement is exactly equal to the interval between successive readouts, virtually all events recorded in detection modules may be saved. This technique is particularly efficient in the above described polymer scintillator-based PET scanners in which the signal duration (~10 ns) is shorter by more than one order of magnitude than the duration of signals in the state of the art PET scanners employing inorganic crystal scintillators.

BRIEF DESCRIPTION OF FIGURES

Example embodiments are presented on a drawing wherein.

DETAILED DESCRIPTION

Figure 1:
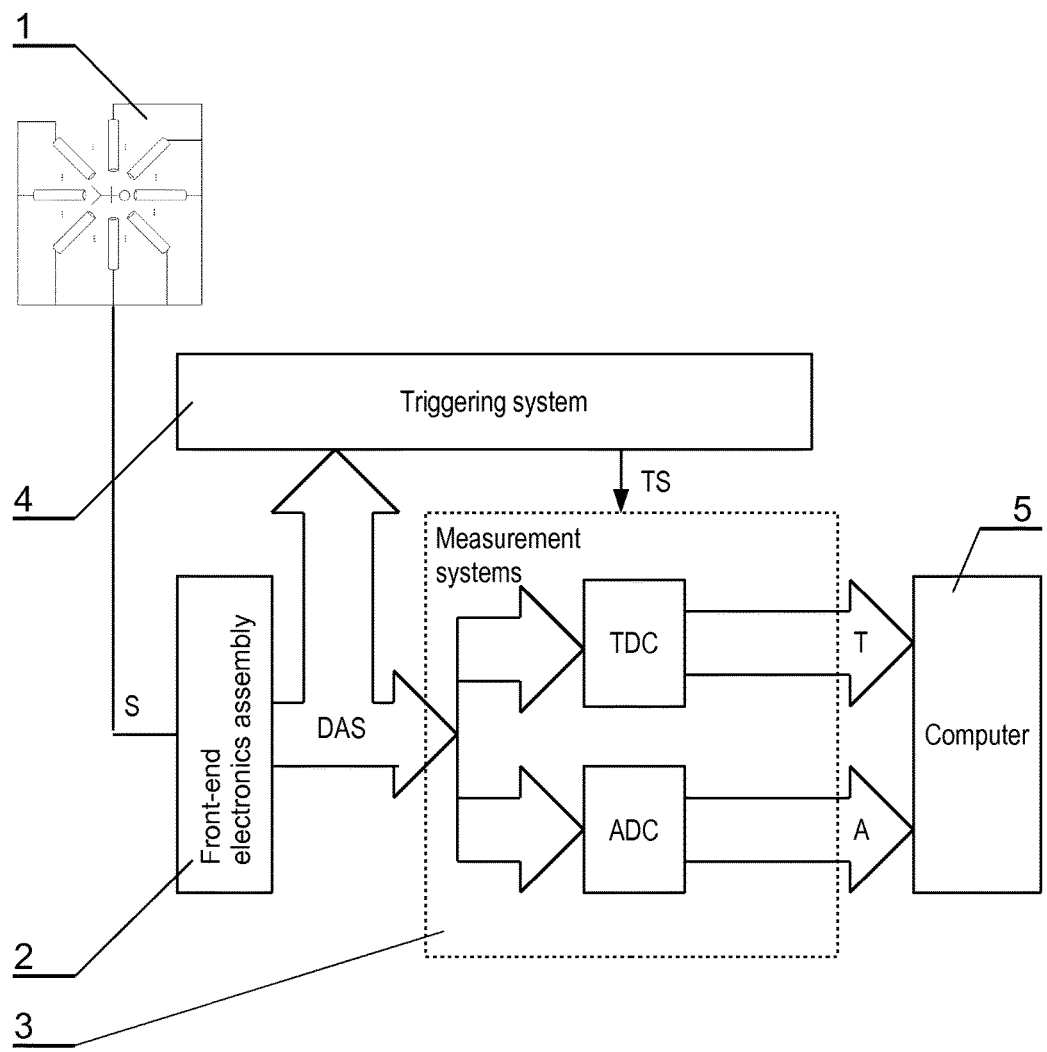
FIG. 1 illustrates a data acquisition system with a triggering system as known from the state of the art.

FIG. 1 illustrates a data acquisition system with a triggering system as known from the state of the art and described in the introduction.

Figure 2:
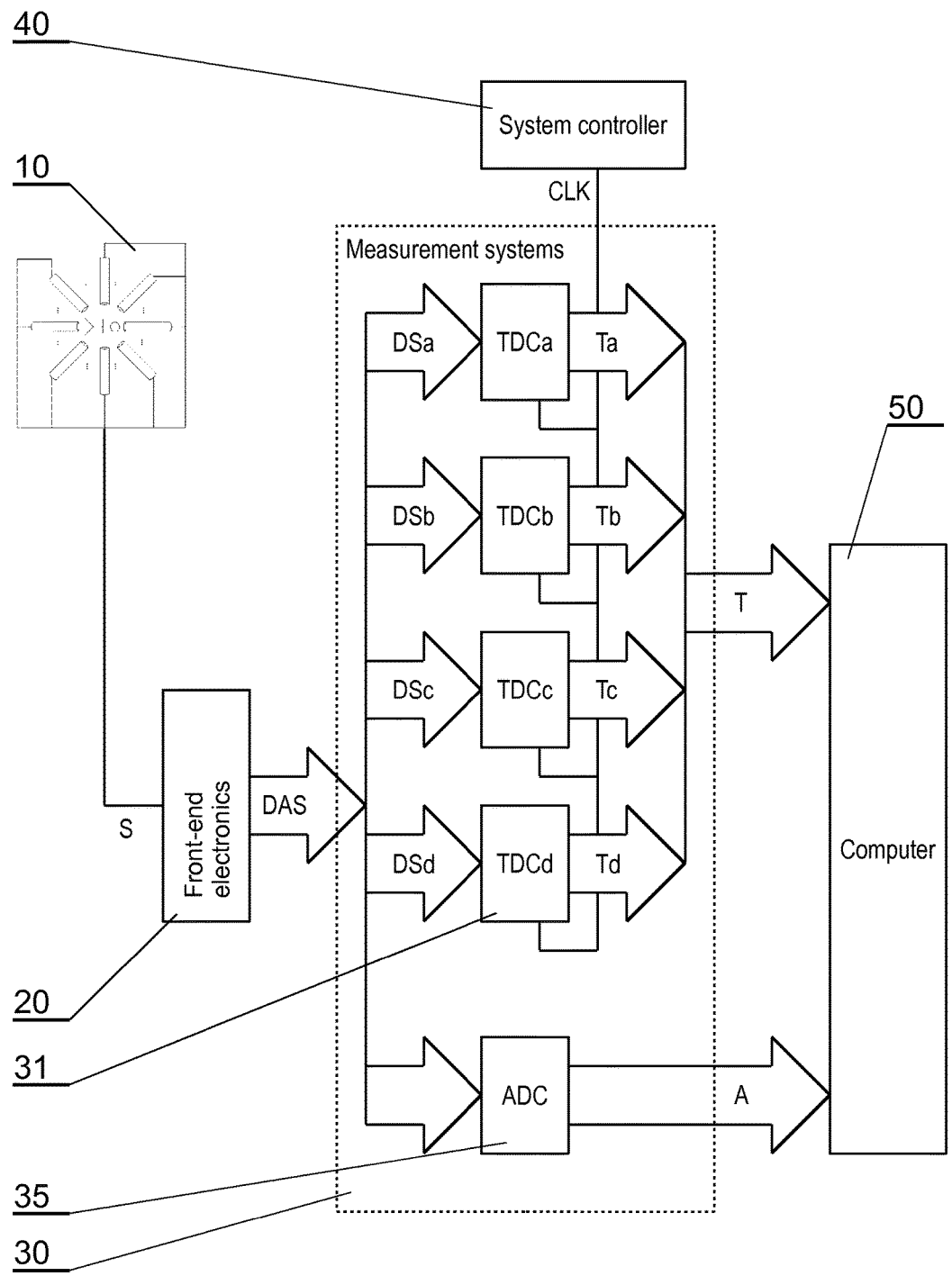
FIG. 2 illustrates an example embodiment of the new data acquisition system.

FIG. 2 illustrates an example embodiment of the new data acquisition system. Analog signals S from the detection module 10 are delivered to the front-end electronics assembly 20. Assembly 20 is responsible for generation of digital and analog signals DAS that carry information on the charge or amplitude of signal S as well as on time at which the analog signal S generated at detectors 10 exceeds the preset threshold voltage. The DASs are then transmitted into the measurement electronics assembly 30 consisting of measurement modules. The measurement modules consist of time-to-digital converters (TDC) used to precisely measure the times of arrival of the digital signals DS, while the analog signals from the front-end electronic assembly are transmitted to the analog-to-digital converter (ADC) 35 used to precisely determine the amplitude or charge of the pulse. The structure of a single TDC module 31 is presented in FIG. 3. In the presented example embodiment of the system, four TDC modules, TDCa, . . . TDCd are used, with the same triggering signal CLK being delivered to each module.

The measurement of a single TDC circuit in each detection module 31 yields a resulting number T that represents the interval between the DS pulse from the front-end electronics assembly 20 and the triggering signal CLK which, for the purposes of this system consists of a constant frequency clock signal CLK delivered from the central system controller 40. The central system controller 40 is a field programmable gate array (FPGA) circuit. The goal of controller 40 is to generate the triggering signal CLK at a preset frequency. The triggering signal CLK is generated at constant frequency to trigger individual measurements within the TDC circuits.

Figure 3:
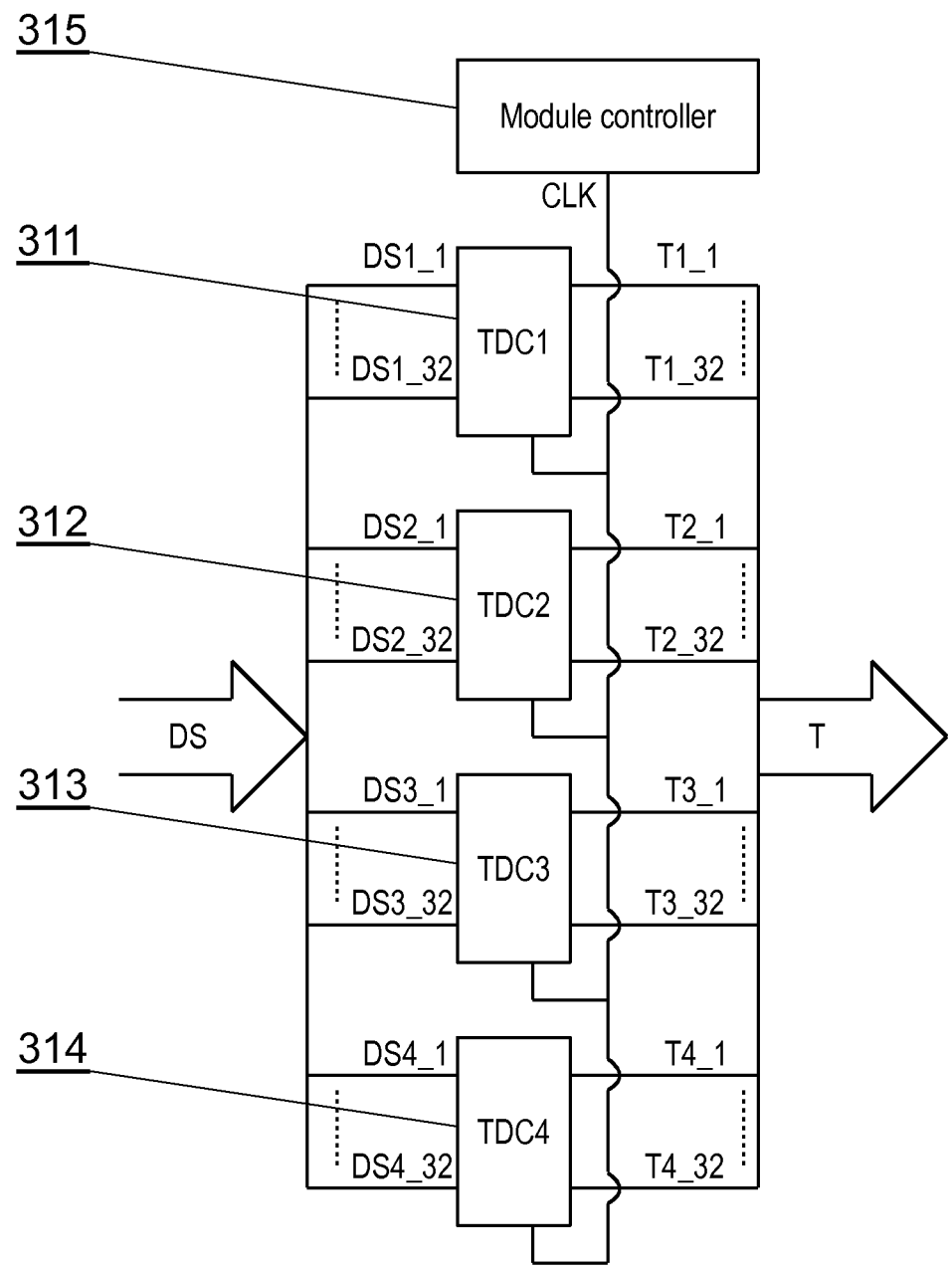
FIG. 3 illustrates an example embodiment of a TDC module.

FIG. 3 illustrates a design of a single TDC module, for instance consisting of a trigger readout board version 3 (TRBv3) as used in high energy physics experiments. These are components consisting of five Lattice ECP3-type FPGA circuits, four of which (311-314) act as TDC circuits for time measurements while the remaining one (315) is used as a module controller and communicates with the system controller 40.

The time measurement carried out within the TDC circuits consists in introduction of a digital input signal DS into a sequence of serially connected elements, each of said elements causing a certain signal delay. Knowing the precise values of these delays and the number of elements the signal has been passed through, one may determine the time elapsed from the start of the measurement. The lower the values of individual delays, the more precise the measurement can be. In case of TDC functionality implemented in FGPA circuits, the internal design of these circuits is used as the delay element. The main construction units of said systems are logical blocks connected by special lines referred to as carry lines. The carry lines are fast connections facilitating the operation of binary summators thus allowing for minimum delays. Connecting such elements into one carry chain affords a single TDC measurement channel.

Each of the FPGA circuits 311-314 acting as TDC converters can provide for e.g. 32 input channels with temporal resolution of 14 ps. The acquired data may be subsequently sent into a computer system either directly or via the system controller 40 using fiber optic connections with data transfer speeds of up to 3.2 Gbps. Data may be transmitted using low-level 8 b/10 b encoding or Gigabit Ethernet protocols. The system controller 40 acting as the triggering system also includes an FPGA circuit selected so as to facilitate implementation of algorithms to analyze and process the incoming data in real time.

Preferably, the triggering signal CLK is transmitted in the LVDS standard using dedicated cables to reduce the signal's susceptibility to interferences.

Fiber optic cables may be connected to every board for the transmission of the control information and the acquired data.

Figure 4:
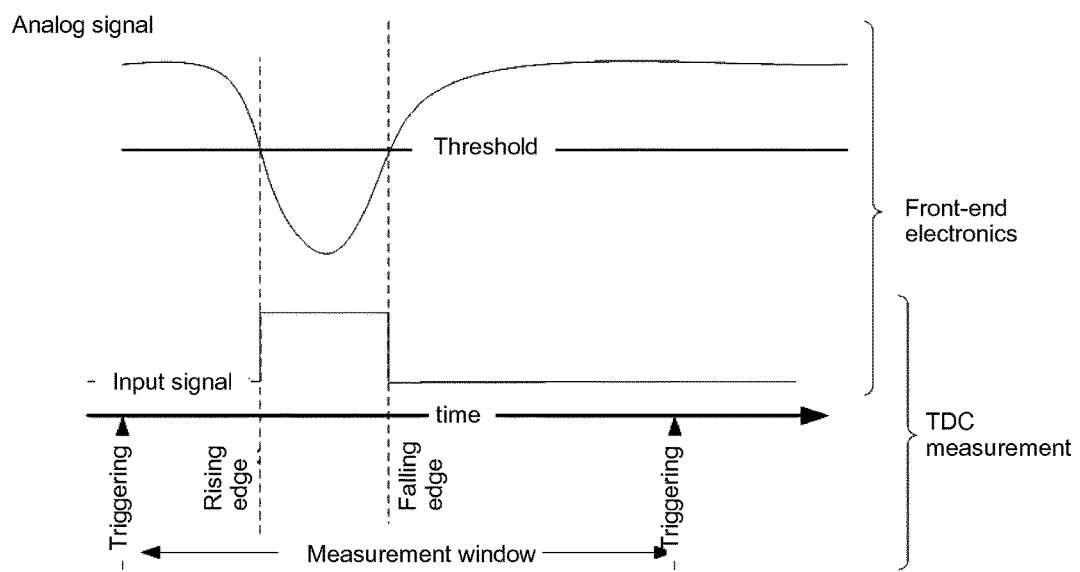
FIG. 4 outlines the measurement of photomultiplier signal.

FIG. 4 presents the outline of the measurement procedure. The measurement procedure is understood as initiation of recording of digital signals DS by the TDC circuits in form of pulses delivered from the front-end electronics assembly 20 and sending the data from the measurement electronics assembly 30. The signals are recorded in periods delimited by two consecutive triggering clock signals CLK and referred to as measurement windows. Thanks to the nature of the FPGA circuits, recorded data may be processed and sent concurrently to the recording of incoming signals. Thus, the dead time between two measurements is negligible and one may assume that the measurement is carried out in a constant manner. Data from isolated measurements describing the digital signals DS recorded during a single measurement window are saved as single data blocks and labeled with consecutive numbers that identify the order of these data. It is possible that a digital signal may overlap with two measurement windows. In such case, the identified signal edges will be separated into two blocks of data labeled by consecutive numbers, thus allowing for their combination in the subsequent analysis. Numbers representing the results of the measurements are then sent into the computer system 50 to be saved onto disk for further data analysis.

The clock signal CLK is generated at constant frequency in a manner independent from signals recorded by the detection system. A dedicated board including an oscillator may be used as the source of the triggering signal. The oscillator signal, passed through the FPGA circuit that applies the pre-set frequency to the input signal is distributed into the measurement electronics.

Owing to the fact that all the measurement circuits 311-314 of the individual measurement modules 31 TDCa . . . TDCd are connected to a shared clock signal, times of signals originating from different events are synchronized, thus allowing to determine the actual time differences between the moments of interactions of the gamma quanta for the entire set of DS data acquired from the moment the device was turned on to the moment signal acquisition is completed during PET or SPECT imaging.

The embodiment of the system controller 40 built in form of FPGA circuit can be easily reprogrammed and reconfigured, ensuring high versatility of the entire system.

The modular design of the system facilitates addition or elimination of elements depending on the number of detection modules.

While the technical solutions presented herein have been depicted, described, and defined with reference to particular preferred embodiment(s), such references and examples of implementation in the foregoing specification do not imply any limitation on the invention. Various modifications and changes may be made thereto without departing from the scope of the technical solutions presented. The presented embodiments are given as example only, and are not exhaustive of the scope of the technical solutions presented herein. Accordingly, the scope of protection is not limited to the preferred embodiments described in the specification, but is only limited by the claims that follow.

The invention claimed is:

1. A system configured to acquire tomographic measurement data from measurement signals (S) of positron emission tomography (PET) or single-photon emission computed tomography (SPECT) detectors, the system comprising:
  a front-end electronic assembly configured to convert the measurement signals (S) into digital and analog signals (DAS);
  a measurement electronics assembly comprising:
    a series of time-to-digital (TDC) modules configured to determine times (T) of pulses in digital signals (DS), each TDC module comprising a series (TDC1-TDC4) of time-to-digital (TDC) circuits ;
    a module controller configured to transmit a clock signal (CLK), input to the module controller from a system controller, to each of the TDC circuits;
    wherein each of the TDC circuits is configured to execute measurements in a measurement window delimited by neighboring edges of the clock signal (CLK) which is common for all the TDC circuits ; and
    wherein the clock signal (CLK) is a measurement triggering signal for each of the TDC circuits and has a configurable, constant frequency throughout the signal acquisition period, and wherein the complete measurements of each of the TDC circuits are performed simultaneously within the neighboring edges of a single period of the clock signal (CLK).

2. The system according to claim 1, wherein the TDC circuits are Field-Programmable Gate Array (FPGA) circuits.

3. The system according to claim 1, wherein the system controller is a Field-Programmable Gate Array (FPGA) circuit.

4. A method to acquire tomographic measurement data from measurement signals (S) of positron emission tomography (PET) or single-photon emission computed tomography (SPECT) detectors, the system comprising:
  a front-end electronic assembly configured to convert the measurement signals (S) into digital and analog signals (DAS);
  a measurement electronics assembly comprising:
    a series of time-to-digital (TDC) modules configured to determine times (T) of pulses in digital signals (DS), each TDC module comprising a series (TDC1-TDC4) of time-to-digital (TDC) circuits ;
    a module controller configured to transmit a clock signal (CLK), input to the module controller from a system controller, to each of the TDC circuits;
  the method comprising the steps of:
  in each of the TDC circuits, executing measurements in a measurement window delimited by neighboring edges of the clock signal (CLK), wherein the clock signal (CLK) is common for all the TDC circuits, triggers the measurement for each of the TDC circuits and has a configurable, constant frequency throughout the signal acquisition period, thereby performing complete measurements of each of the TDC circuits simultaneously within the neighboring edges of a single period of the clock signal (CLK).

* * * * *